US006789228B1

(12) United States Patent
Merril et al.

(10) Patent No.: US 6,789,228 B1
(45) Date of Patent: Sep. 7, 2004

(54) METHOD AND SYSTEM FOR THE STORAGE AND RETRIEVAL OF WEB-BASED EDUCATION MATERIALS

(75) Inventors: Jonathan R. Merril, Great Falls, VA (US); Peter A. Mangiafico, Reston, VA (US); Rita Roy, Great Falls, VA (US); Paul McGuire, Washington, DC (US); Torsten Koehler, Sterling, VA (US)

(73) Assignee: Medical Consumer Media, Reston, VA (US)

( * ) Notice: Subject to any disclaimer, the term of this patent is extended or adjusted under 35 U.S.C. 154(b) by 569 days.

(21) Appl. No.: 09/073,871

(22) Filed: May 7, 1998

(51) Int. Cl.[7] .............................................. G06F 15/00
(52) U.S. Cl. ..................... 715/500.1; 345/730; 345/732
(58) Field of Search ................ 345/302, 328, 345/730, 732, 723; 707/500.1; 715/500.1

(56) References Cited

U.S. PATENT DOCUMENTS

| | | | | |
|---|---|---|---|---|
| 4,399,455 A | * | 8/1983 | Alvarez ........................ 358/60 |
| 5,473,744 A | * | 12/1995 | Allen et al. ............... 707/500.1 |
| 5,649,060 A | * | 7/1997 | Ellozy et al. ................ 345/302 |
| 5,664,218 A | * | 9/1997 | Kim et al. ...................... 345/15 |
| 5,786,814 A | * | 7/1998 | Moran et al. ................ 345/328 |
| 5,812,736 A | * | 9/1998 | Anderson .................... 386/96 |
| 5,818,800 A | * | 10/1998 | Barker ......................... 369/25 |
| 5,835,667 A | * | 11/1998 | Wactlar et al. ................ 386/96 |
| 5,956,668 A | * | 9/1999 | Alshawi et al. ................. 704/2 |
| 5,990,931 A | * | 11/1999 | Nimri et al. ............. 348/14.08 |
| 5,991,735 A | * | 11/1999 | Gerace ........................... 705/1 |
| 5,995,095 A | * | 11/1999 | Ratakonda .................. 382/225 |
| 6,006,241 A | * | 12/1999 | Purnaveja et al. .......... 707/512 |
| 6,008,807 A | * | 12/1999 | Bretschneider et al. ..... 345/339 |
| 6,025,827 A | * | 2/2000 | Bullock et al. ............. 345/781 |
| 6,031,526 A | * | 2/2000 | Shipp ...................... 707/500.1 |
| 6,038,257 A | * | 3/2000 | Brusewitz et al. ........ 348/14.14 |
| 6,041,333 A | * | 3/2000 | Bretschneider et al. ..... 707/203 |
| 6,072,480 A | * | 6/2000 | Gorbet et al. ................ 345/730 |
| 6,084,582 A | * | 7/2000 | Qureshi ....................... 345/302 |
| 6,085,047 A | * | 7/2000 | Taka ........................... 396/374 |
| 6,100,881 A | * | 8/2000 | Gibbons et al. ......... 715/500.1 |
| 6,108,001 A | * | 8/2000 | Tuttle .......................... 345/730 |
| 6,108,687 A | * | 8/2000 | Craig .......................... 709/203 |
| 6,141,001 A | * | 10/2000 | Baleh ...................... 715/500.1 |
| 6,160,907 A | * | 12/2000 | Robotham et al. .......... 382/154 |
| 6,198,477 B1 | * | 3/2001 | Kurtze et al. ............ 707/500.1 |
| 6,240,459 B1 | * | 5/2001 | Roberts et al. ............. 709/232 |

OTHER PUBLICATIONS

Kuo et al., A Synchronization scheme for multimedia annotation, IEEE 1997, pp. 594–598.*
Pullen, Synchronous distance education via the Internet, IEEE Nov. 1996, pp. 285–288.*

* cited by examiner

*Primary Examiner*—Stephen S. Hong
*Assistant Examiner*—Conglac Huynh
(74) *Attorney, Agent, or Firm*—Burns, Doane, Swecker & Mathis, L.L.P.

(57) ABSTRACT

A system is provided that automatically digitally captures lecture presentation slides and speech and stores the data in a memory. This system also prepares this information for Internet publication and publishes it on the Internet for distribution to end-users. The system generally comprises three main functions: (1) capturing the lecture and storing it into a computer memory or database, (2) generating a transcript from the lecture and the presentation slides and automatically summarizing and outlining the transcripts, and (3) publishing the lecture slides image data, audio data, and transcripts on the Internet for use by client computers. The system synchronizes the slide image data, audio data and the transcripts, and the clients can view and search the published lecture presentation from a slide image projector to a digital camera for digital image data capture.

18 Claims, 12 Drawing Sheets

METHOD AND SYSTEM FOR THE STORAGE AND RETRIEVAL OF WEB-BASED EDUCATION MATERIALS

BACKGROUND

1. Field of the Invention

The present invention generally relates to a data processing system for digitally recording lectures and presentations. More particularly, it relates to the conversion of these lectures with little intervention to a standard Internet format for publication.

2. Related Art

The majority of corporate and educational institution training occurs in the traditional lecture format in which a speaker addresses an audience to disseminate information. Due to difficulties in scheduling and geographic diversity of speakers and intended audiences, a variety of techniques for recording the content of these lectures have been developed. These techniques include videotapes, audio tapes, transcription to written formats and other means of converting lectures to analog (non-computer based) formats.

More recently, with the advent and growing acceptance of the Internet and the World Wide Web, institutions have started to use this communication medium to broadcast lectures. Conventionally, in order to create a Web-based lecture presentation that utilizes 35-mm slides or other projected media and that includes audio, a laborious process is necessary. This process involves manually removing each slide and digitizing it and manually recording and digitizing the audio into a Web-based format. In addition, to complete the lecture materials, each slide must be manually synchronized with the respective portion of audio. Thus, the entire process of converting a lecture into a format that can be published on the Internet is labor intensive, time-consuming and expensive.

One technological challenge has been allowing audio/visual media to be made available on relatively low bandwidth connections (such as 14.4 kilobits/second modems). Native audio and visual digital files are too large to receive in a timely manner over these low bandwidth modems. This technological challenge becomes prohibitive when one attempts to transmit a lecture over the Internet, which requires slide updates while maintaining simultaneous audio transmission. To this end, Real Networks™, Microsoft™, VDOlive™ and several other companies have pioneered and commercialized a variety of techniques which allow for continuous, uninterrupted transmission of sound and images over the Internet, even over low bandwidth connections. This format, known as "streaming", does not require the end-user to obtain the entire audio or video file before they can see or hear it. Recently, Microsoft has provided a standard media format for Web-based multimedia transmission over the Internet. This standard is called the "Active Streaming Format" (ASF). The ASF Format is further described at the Internet website http://www.microsoft.com/mind/0997/netshow/netshow.htm, which is incorporated herein by reference.

Furthermore, a variety of manufacturers (e.g., Kodak, Nikon, AGFA) have developed technologies for scanning 35-mm slides and digitizing them. However, these systems have several disadvantages. Most significantly, they require removal of the slides from a slide carousel. Additionally, they require a separate, time-consuming scanning process (on the order of several seconds per slide), and as a result, a lecturer cannot use the scanners when giving a presentation due to the delay of scanning each slide independently. Even further, they are not optimized for capturing slide information for the resolution requirements of the Internet. These requirements are generally low compared with typical slide scanners, since smaller file size images are desired for Internet publishing. Finally, they are not designed to capture audio or presentation commands (such as forward and reverse commands for slide changes).

One device recently introduced to the market under the name "CoolPix 300™" (available from Nikon of Melville, N.Y.) allows for digital video image and digital audio capture as well as annotation with a stylus. However, the device does not permit slide scanning and does not optimize the images and audio for use on the Internet. Its audio recording is also limited to a relatively short 17 minutes. Similarly, digital audio/video cameras (such as the Sony Digital Handycam series) allow for the digital video and audio recording of lectures but have no direct means of capturing slides. In addition, they are not set up to record information in a manner that is optimized for the Internet. Generally, with these systems, the amount of audio captured is limited to about one hour before a new cassette is required to be inserted into the camera.

Although these conventional techniques offer the capability to transmit educational materials, their successful deployment entails significant additional manual efforts to digitize, synchronize, store, and convert to the appropriate digital format to enable use on the Internet. Adding to the cost and delay, additional technical staff may be required to accomplish these goals. Furthermore, there is a time delay between the lecture and its availability on the Internet due to the requirement that the above processes take place. As such, the overall time required for processing a lecture using conventional methods and systems is five to ten hours.

Another related technology for storing, searching and retrieving video information is called the "Infomedia Digital Video Library" and is developed by Carnegie Mellon University of Pittsburgh, Pa. However, the system under consideration will use previously recorded materials for inclusion into the database and thus makes no provisions for recording new materials and quickly transferring them into the database. Moreover, in this effort, there was no emphasis on slide-based media.

It is therefore desirable to provide a system that allows a presenter to store the contents of a lecture so that it may be broadcast across the Web. It is further desirable to provide a system that allows the efficient searching and retrieval of these Web-based educational materials.

SUMMARY

Methods and systems consistent with the present invention satisfy this and other desires by optimizing and automating the process of converting lecture presentations into a Web-based format and allowing for the remote searching and retrieval of the information. Typically, systems consistent with the present invention combine the functionality of a projection device, a video imaging element, an audio recorder, and a computer. Generally, the computer implements a method for the conversion and enhancement of the captured lectures into a Web-based format that is fully searchable, and the lecture can be served immediately to the Internet.

A method is provided for recording and storing a lecture presentation using slides and audio comprising the steps of initiating display of a slide image, capturing slide image data from the slide image automatically in response to the initiation and storing the slide image data in a memory. The method may further include the steps of recording audio signals associated with the slide image, capturing audio data from the audio signals, and storing the audio data in a memory.

The advantages accruing to the present invention are numerous. For example, a presenter of information can capture his or her information and transform it into a Web-based presentation with minimal additional effort. This Web-based presentation can then be served to the Internet with little additional intervention. The nearly simultaneous recording, storage and indexing of educational content using electronic means reduces processing time from more than five hours to a matter of minutes. Systems consistent with the present invention also provide a means of remotely searching and retrieving the recorded educational materials.

In one implementation, optical character recognition and voice recognition software can be run on the slide data and audio recordings to produce transcripts. Using additional software, these transcripts can be automatically indexed and summarized for efficient searching.

The above desires, other desires, features, and advantages of the present invention will be readily appreciated by one of ordinary skill in the art from the following detailed description of the preferred implementations when taken in connection with the accompanying drawings.

DETAILED DESCRIPTION

Overview

Figure 1:
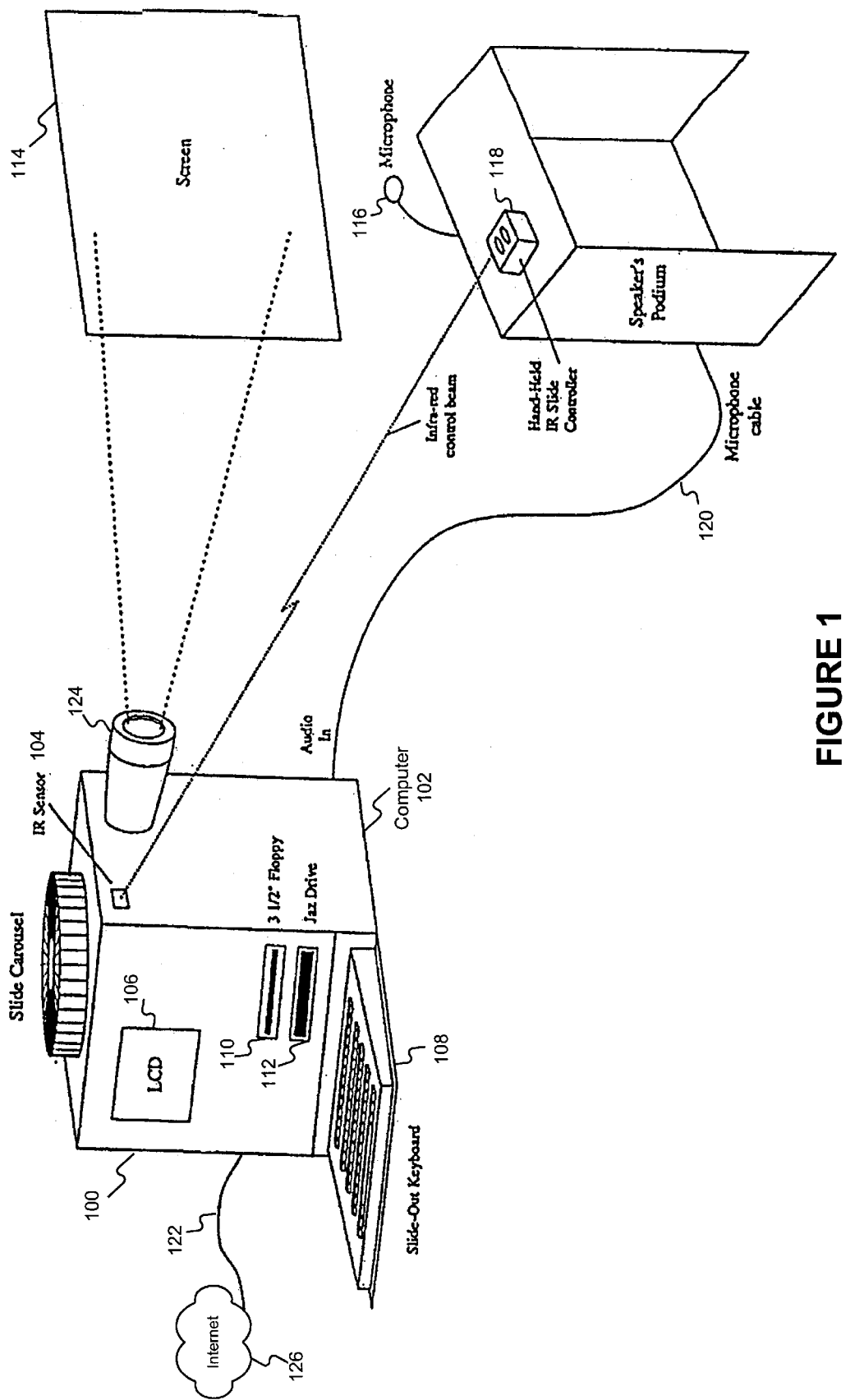
FIG. 1 illustrates hardware components of a system consistent with present invention.

Systems consistent with the present invention digitally capture lecture presentation slides and speech and store the data in a memory. They also prepare this information for Internet publication and publish it on the Internet for distribution to end-users. These systems comprise three main functions: (1) capturing the lecture and storing it into a computer memory or database, (2) generating a transcript from the lecture and the presentation slides and automatically summarizing and outlining the transcripts, and (3) publishing the lecture slides image data, audio data, and transcripts on the Internet for use by client computers.

Generally, when the lecturer begins presenting, and the first slide is displayed on the projection screen by a projector, a mirror assembly changes the angle of the light being projected on the screen for a brief period of time to divert it to a digital camera. At this point, the digital camera captures the slide image, transfers the digital video image data to the computer, and the digital video image data is stored on the computer. The mirror assembly then quickly flips back into its original position to allow the light to be projected on the projection screen as the lecturer speaks. When this occurs, an internal timer on the computer begins counting. This timer marks the times of the slide changes during the lecture presentation. Simultaneously, the system begins recording the sound of the presentation when the first slide is presented. The digital images of the slides and the digital audio recordings are stored on the computer along with the time stamp information created by the timer on the computer to synchronize the slides and audio.

Upon each subsequent slide change, the mirror assembly quickly diverts the projected light to the digital camera to capture the slide image in a digital form, and then it flips back into its original position to allow the slide to be displayed on the projection screen. The time of the slide changes, marked by the timer on the computer, is recorded in a file on the computer. At the end of the presentation, the audio recording stops, and the computer memory stores digital images of each slide during the presentation and a digital audio file of the lecture speech. Additionally, it will have a file denoting the time of each slide change.

Alternatively, in another implementation, slides can be generated using machines that are not conventional slide projectors. A computer-generated slide presentation can be used, thereby avoiding the need of the mirror assembly and the digital camera. In the case of the computer-generated slide (e.g., PowerPoint™ available from Microsoft Corporation of Redmond, Wash.), the digital video image data from the computer generating the slide is transferred to the system's computer at the same time that the slide is projected onto the projection screen. Similarly, slides may be projected from a machine using overhead transparencies or paper documents. This implementation also avoids the need for the mirror assembly and the digital camera, because it, like the computer generated presentations, transfer the video image data directly to the computer for storage at the same time that it projects the image onto the projection screen. Any of these methods or other methods may be used to capture digital video image data of the presentation slides in the computer. Once stored in the computer, the digital video and audio files may be published to the Internet or, optionally, enhanced for more efficient searching on the Internet.

During the optional lecture enhancement, optical character recognition software is applied to each slide image to obtain a text transcript of the words on a slide image. Additionally, voice recognition software is applied to the digital audio file to obtain a transcript of the lecture speech. Once these transcripts are obtained, automatic summarization and outlining software can be applied to the transcripts to create indexes and outlines easily searchable by a user. In addition to the enhanced files, the user will also be able to search the whole transcript of the lecture speech.

Finally, after transferring the files to a database, systems consistent with the present invention publish these slide image files, audio files and transcript files to the Internet for use by Internet clients. These files are presented so that an Internet user can efficiently search and view the lecture presentation.

Systems consistent with the present invention thus allow a lecture presentation to be recorded and efficiently transferred to the Internet for use by end-users. Whereas several implementations of the present invention are possible, some alternative embodiments are also discussed below.

System Description

Figure 2:
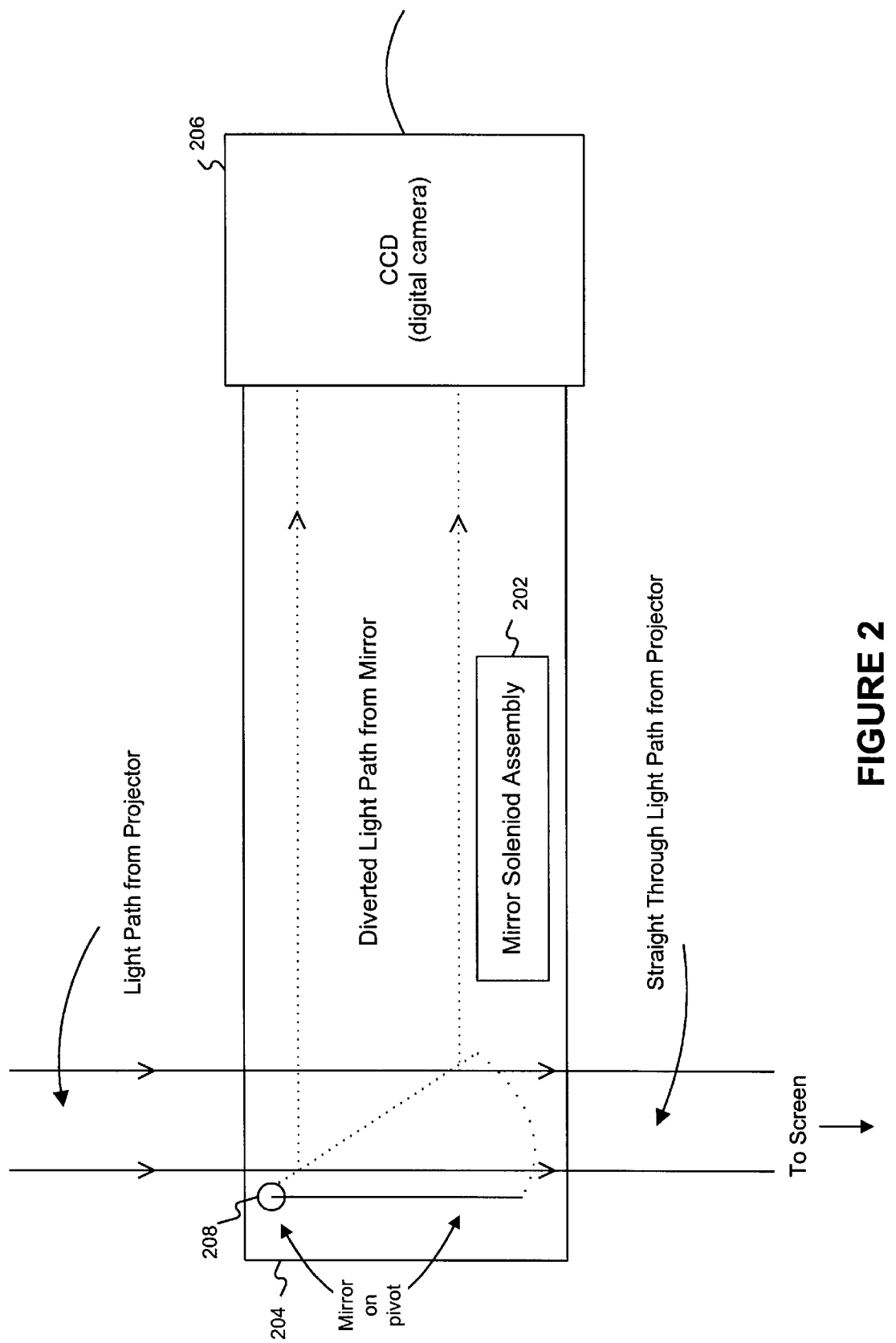
FIG. 2 illustrates a mirror assembly used to redirect light from a projection device to a digital camera consistent with the present invention.

FIGS. 1 and 2 illustrate hardware components in a system consistent with the present invention. Although FIG. 1 shows an implementation with a slide projector, the system allows a presenter to use a variety of media for presentation: 35-mm slides, computer-generated presentations, overhead transparencies or paper documents. The overhead transparencies and paper documents will be discussed below with reference to FIG. 4.

FIG. 1 demonstrates the use of the system with an integrated 35-mm slide projector 100 that contains a computer. The output of the projection device passes through an optical assembly that contains a mirror, as shown in FIG. 2. In the implementation shown in FIG. 1, the mirror assembly 204 is contained in the integrated slide projector 100 behind the lens 124 and is not shown on the FIG. 1. This mirror assembly 204 diverts the light path to a chargecoupled device (CCD) 206 for a brief period of time so that the image may be captured. A CCD 206 is a solid-state device that converts varying light intensities into discrete digital signals, and most digital cameras (e.g., the Pixera Professional Digital Camera available from Pixera Corporation of Los Gatos, Calif.) use a CCD for the digital image capturing process. The video signal carrying the digital video image data from the CCD 206 enters a computer 102, which is integrated within the projection box in this implementation, via a digital video image capture board contained in the computer (e.g., TARGA 2000 RTX PCI video board available from Truevision of Santa Clara, Calif.). This system is equipped with a device (e.g., Grand TeleView available from Grandtec UK Limited, Oxon, UK) that converts from SVGA or Macintosh computer output and allows for conversion of this signal into a format which can be captured by the Truevision card, whereas the Truevision card is accepts an NTSC (National Television Standards Committee) signal.

As the lecturer changes slides or transparencies, the computer 102 automatically records the changes. Changes are detected either by an infrared (IR) slide controller 118 and IR sensor 104, a wired slide controller (not shown) or an algorithm driven scheme implemented in the computer 102.

As shown in FIG. 2, when a slide change is detected either via the slide controller 118 or an automated algorithm, the mirror 208 of the mirror assembly 204 is moved into the path of the projection beam at a 45-degree angle. A solenoid 202, an electromagnetic device often used as a switch, controls the action of the mirror 208. This action directs all of the light away from the projection screen 114 and towards the CCD 206. The image is brought into focus on the CCD 206, digitally encoded and transmitted to the computer 102 via the video-capture board 302 (shown in FIG. 3 described below). At this point, the mirror 208 flips back to the original position allowing the light for the new slide to be directed towards the projection screen 114. This entire process takes less than one second, since the video capture is a rapid process. Furthermore, this rapid process is not easily detectable by the audience since there is already a pause on the order of a second between conventional slide changes. In addition, the exact time of the slide changes, as marked by a timer in the computer, is recorded in a file on the computer 102.

Figure 3:
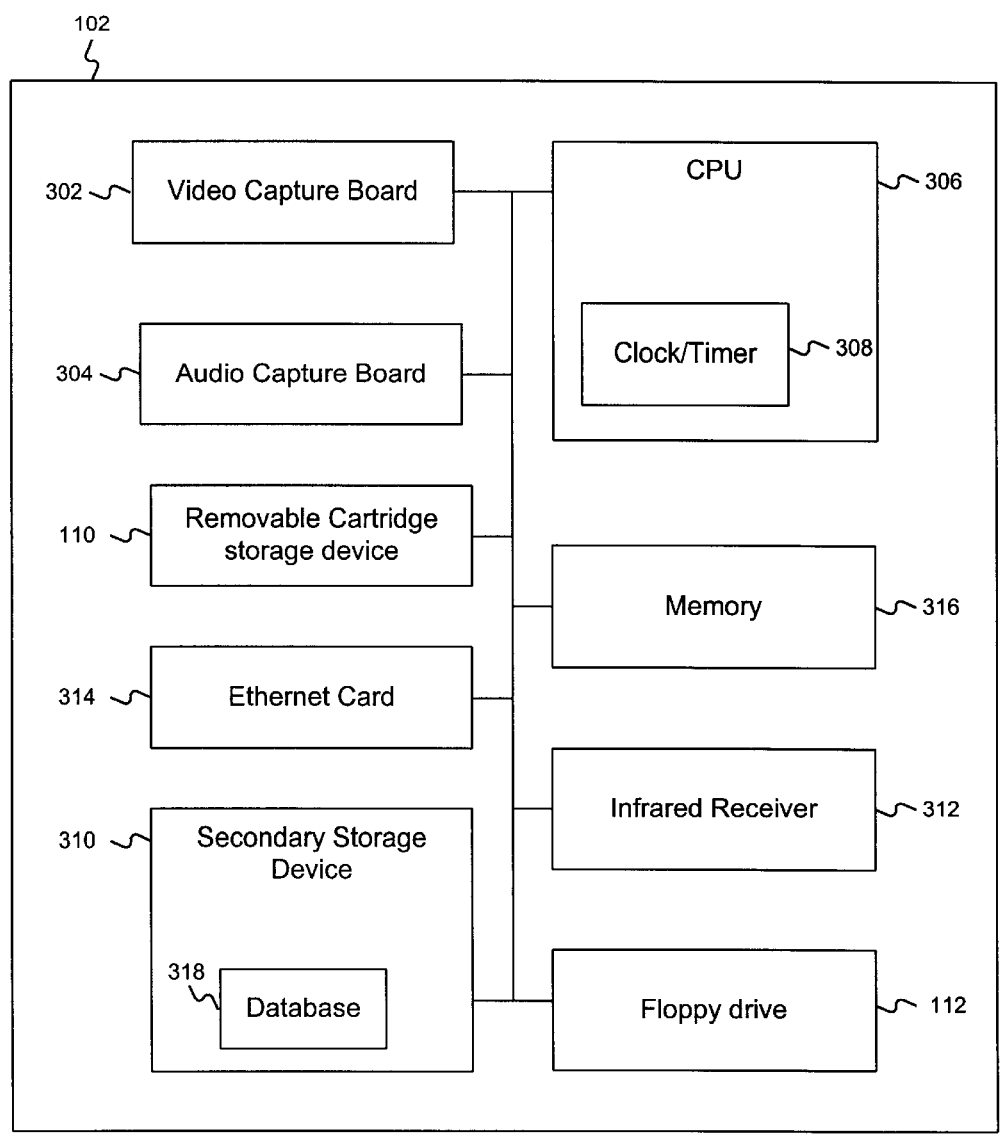
FIG. 3 depicts the components of a computer consistent with the present invention.

FIG. 3 depicts the computer 102 contained in the integrated slide projector 100 in this implementation. It consists of a CPU 306 capable of running Java applications (such as the Intel Pentium (e.g., 400 MHz Pentium II Processors) central processors and Intel Motherboards (Intel® N440BX server board) from Intel of Santa Clara, Calif.), an audio capture card 304 (e.g., AWE64 SoundBlaster™ available from Creative Labs of Milpitas, Calif.), a video capture card 302, an Ethernet card 314 for interaction with the Internet 126, a memory 316, a secondary storage device 310 (which may be a hard disk drive), and an infrared receiver 312 to receive a slide change signal from the slide change controller 118. The CPU 306 also has a timer 308 for marking slide change times, and the secondary storage device 310 contains a database 318 for storing and organizing the lecture data. Referring back to FIG. 1, the computer 102 contains an integrated LCD display panel 106, and a slide-out keyboard 108 used to switch among three modes of operation discussed below. For file storage and transfer to other computers, the computer 102 also contains a floppy drive 112 and a high-capacity removable media drive 110, such as a Jaz™ drive available from Iomega of Roy, Utah. The computer 102 may also be equipped with multiple CPUs 306, thus enabling the performance of several tasks simultaneously, such as capturing a lecture and serving a previous lecture over the Internet.

Simultaneously with the slide capturing, audio signals are recorded using a microphone 116 connected by a cable 120 to the audio capture card 304 which is an analog to digital converter in the computer 102, and the resulting audio files are placed into the computer's secondary storage device 310.

In one implementation consistent with the present invention, the presentation slides are computer-generated. In the case of a computer-generated presentation, the video signal from the computer (not shown) generating the presentation slides is sent to a VGA to NTSC conversion device and then to the video capture board 302 before it is projected onto the projection screen 114, thus eliminating the need to divert the beam or use the mirror assembly 204 or the CCD 206. This also results in a higher-quality captured image.

Figure 4:
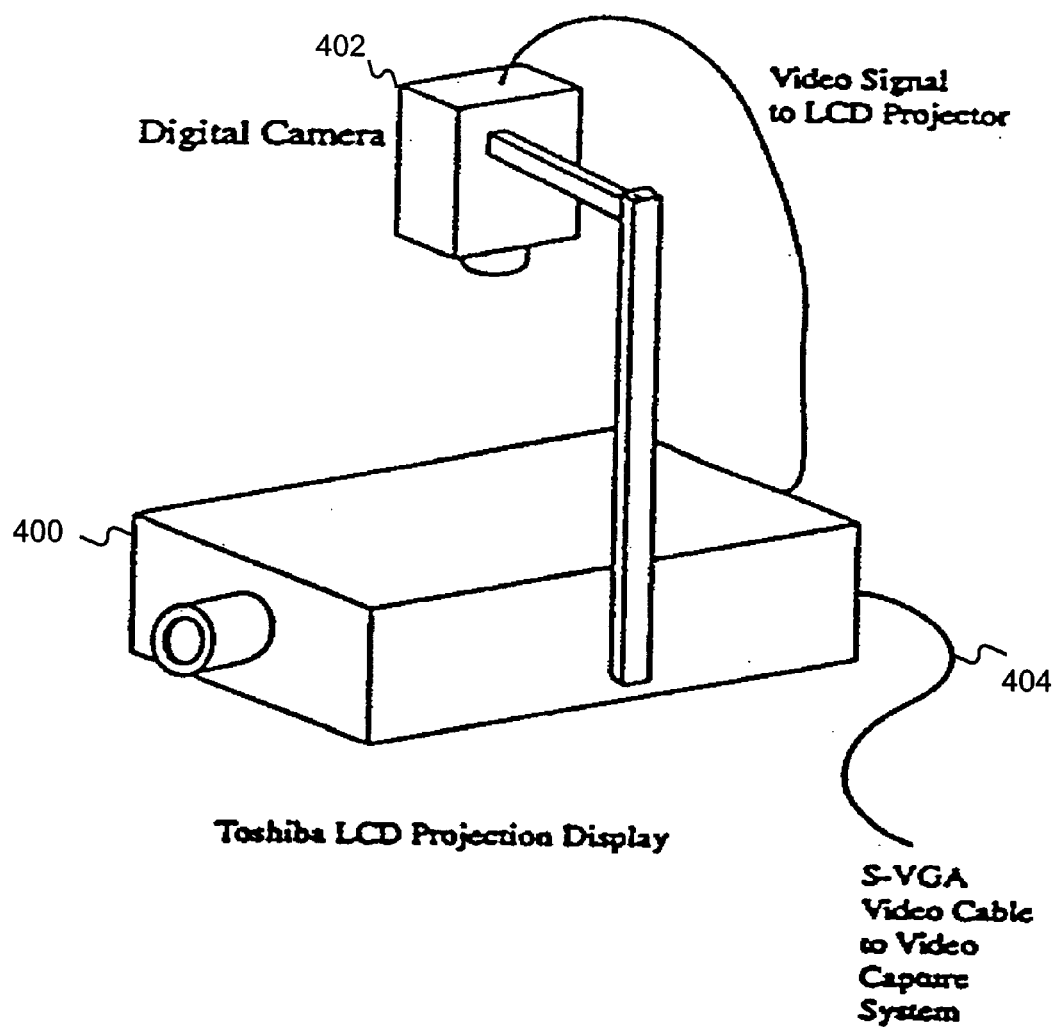
FIG. 4 illustrates alternate connections to an overhead projector and LCD projector consistent with the present invention.

FIG. 4 illustrates hardware for use in another implementation in which overhead transparencies or paper documents are used instead of slides or computer-generated images. Shown in FIG. 4 is an LCD projector 400 with an integrated digital camera 402, such as the Toshiba MediaStar TLP-511 U. This projection device allows overhead transparencies and paper documents to be captured and converted to a computer video signal, such as SVGA. This SVGA signal can then be directed to an SVGA-input cable 404. In this case, the computer 102 detects the changing of slides via an algorithm that senses abrupt changes in video signal intensity, and the computer 102 records each slide change. As in the computer-generated implementation, the video signal is captured directly before being projected, (i.e., the mirror assembly 204 and CCD 206 combination shown in FIG. 2 is not necessary).

In one implementation, optical character recognition is performed on the captured slide data using a product such as EasyReader Elite™ from Mimetics of Cedex, France. Also, voice recognition is performed on the lecture audio using a product such as NaturallySpeaking™ available from Dragon Systems of Newton, Mass. These two steps generate text documents containing full transcripts of both the slide content and the audio of the actual lecture. In another implementation, these transcripts are passed through outline-generating software, such as LinguistX™ from Inxight of Palo Alto, Calif., which summarizes the lecture transcripts, improves content searches and provides indexing. Other documents can then be linked to the lecture (i.e., an abstract, author name, date, time, and location) based on the content determination.

These documents, along with the slide image information, are converted to Web-ready formats. This audio, slide, and synchronization data is stored in the database 318 (e.g., Microsoft SQL) which is linked to each of the media elements. The linking of the database 318 and other media elements can be accomplished with an object-linking model, such as Microsoft's Component Object Model (COM). The information stored in the database 318 is made available to Internet end-users through the use of a product such as Microsoft Internet Information Server (IIS) software, and is fully searchable.

Methods and systems consistent with the present invention thus enable the presenter to give a presentation and have the content of the lecture made available on the Internet with little intervention. While performing the audio and video capture, the computer 102 automatically detects slide changes (i.e., via the infrared slide device or an automatic sensing algorithm), and the slide change information is encoded with the audio and video data. In addition, the Web-based lecture contains data not available at the time of the presentation such as transcripts of both the slides and the narration, and an outline of the entire presentation. The presentation is organized using both time coding and the database 318, and can be searched and viewed using a standard Java™ enabled Web-interface, such as Netscape Navigator™. Java is a platform-independent, object-oriented language created by Sun Microsystems™. The Java programming language is further described in "The Java Language Specification" by James Gosling, Bill Joy, and Guy Steele, Addison-Wesley, 1996, which is herein incorporated by reference. In one implementation, the computer 102 serves the lecture information directly to the Internet if a network connection 122 is established using the Ethernet card 314 or modem (not shown). Custom software, written in Java for example, integrates all of the needed functions for the computer.

Figure 5:
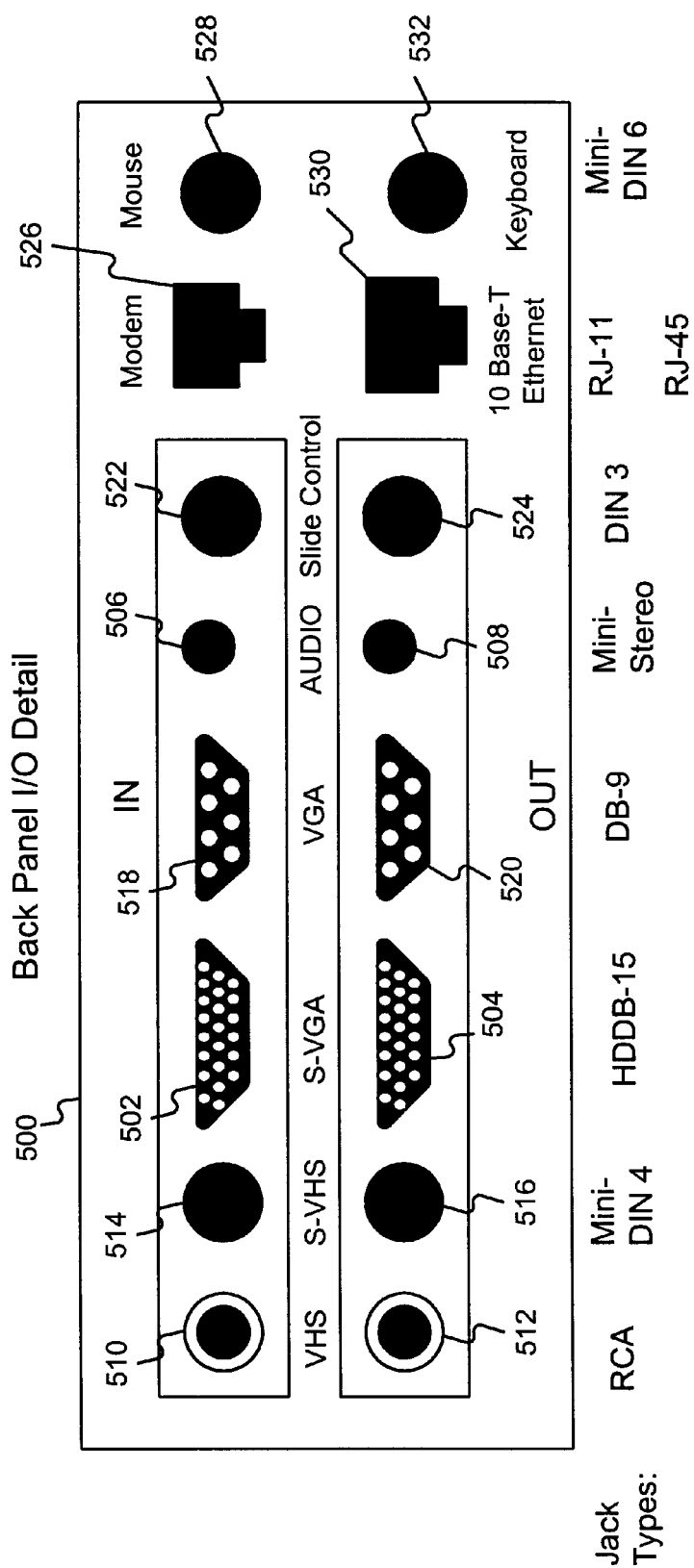
FIG. 5 shows input and output jacks on a system consistent with the present invention.

FIG. 5 shows, in detail, the ports contained on the back panel 500 of the integrated 35-mm slide projection unit 100 consistent with the present invention: SVGA-in 502, SVGA-out 502, VHS and SVHS in and out 510–516, Ethernet 530, modem 526, wired slide control in 522 and out 524, audio in 506 and out 508, keyboard 532 and mouse port 528. In addition, a power connection (not shown) is present.

Operation

Generally, three modes of operation will be discussed consistent with the present invention. These modes include: (1) lecture-capture mode, (2) lecture enhancement mode, and (3) Web-publishing mode.

Capturing Lectures

Figure 6:
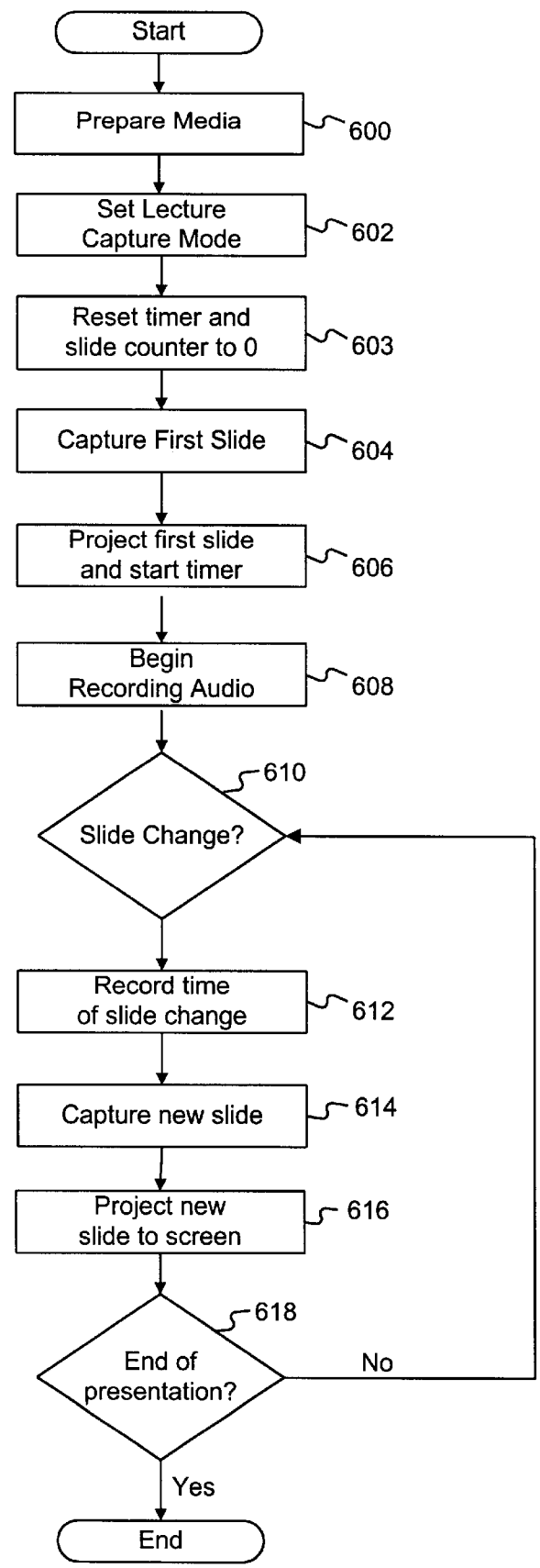
FIG. 6 is a flowchart illustrating a method for capturing a lecture consistent with the present invention.

FIG. 6 depicts steps used in a method consistent with the present invention for capturing a lecture. This lecture capture mode is used to capture the basic lecture content in a format that is ready for publishing on the Internet. The system creates data from the slides, audio and timer, and saves them in files referred to as "source files."

At the beginning of the lecture, the presenter prepares the media of choice (step 600). If using 35-mm slides, the slide carousel is loaded into the tray on the top of the projector 100. If using a computer-generated presentation, the presenter connects the slide generating computer to the SVGA input port 502 shown in the I/O ports 500. If using overhead transparencies or paper documents, the presenter connects the output of a multi-media projector 400 (such as the Toshiba MediaStar described above and shown in FIG. 4) to the SVGA input port 502. A microphone 116 is connected to the audio input port 506, and an Ethernet networking cable 122 is attached between the computer 102 and a network outlet in the lecture room. For ease of the discussion to follow, any of the above projected media will be referred to as "slides."

At this point, the presenter places the system into "lecture-capture" mode (step 602). In one implementation, this is done through the use of a keyboard 108 or switch (not shown). When this action occurs, the computer 102 creates a directory or folder on the secondary storage device 310 with a unique name to hold source files for this particular lecture. The initiation of the lecture capture mode also resets the timer and slide counter to zero (step 603). In one implementation, three directories or folders are created to hold the slides, audio and time stamp information. Initiation of lecture capture mode also causes an immediate capture of the first slide using the mirror assembly 204 (step 604). The mirror assembly 204 flips to divert the light path from the projector to the CCD 206 of the digital camera. Upon the capturing of this first slide, the digital image is stored in an image format, such as a JPEG format graphics file (a Web standard graphics format), in the slides directory on the secondary storage device 310 of the computer 102 (i.e., slides/slide01.jpg). After the capturing of the image by the CCD 206, the mirror assembly 204 flips back to allow the light path to project onto the projection screen 114. The first slide is then projected to the projection screen 114, and the internal timer 308 on the computer 102 begins counting (step 606).

Next, systems consistent with the present invention record the audio of the lecture through the microphone 116 and pass the audio signal to the audio capture card 304 installed in the computer 102 (step 608). The audio capture card 304 converts the analog signal into a digital signal that can be stored as a file on the computer 102. When the lecture is completed, this audio file is converted into the Active Streaming Format or RealAudio format for efficient Internet publishing. In one implementation, the audio signal is encoded into the Active Streaming Format or RealAudio format in real time as it arrives and is placed in a file in a directory on the secondary storage device 310. Although, this implementation requires more costly hardware (i.e., an upgraded audio card), it avoids the step of converting the original audio file into the Internet formats after the lecture is complete. Regardless, the original audio file (i.e., unencoded for streaming) is retained as a backup on the secondary storage device 310.

When the presenter changes a slide (step 610) using the slide control 118 or by changing the transparency or document, the computer 102 increments the slide counter by one and records the exact time of this change in an ASCII file (a computer platform and application independent text format), referred to as the "time-stamp file", written on the secondary storage device 310 (step 512). This file has, for example, two columns, one denoting the slide number and the other denoting the slide change time. In one implementation, it is stored in the time stamp folder.

Using the mirror assembly 204 (FIG. 2), the new slide is captured into a JPEG format graphics file (i.e., slide#.jpg, where # is the slide number) that is stored in the slides folder on the secondary storage device 310. When the new slide is captured, the mirror assembly 204 quickly diverts the light from the slide image back to the projection screen 114 (step 616). If any additional slides are presented, these slides are handled in the same manner (step 618), and the system records the slide change time and captures the new slide in the JPEG graphics file format.

At the completion of the lecture, the presenter stops the "lecture capture" mode with the keyboard 108. This action stops the timer and completes the lecture capturing process.

Enhancing Lecture Content

Figure 7:
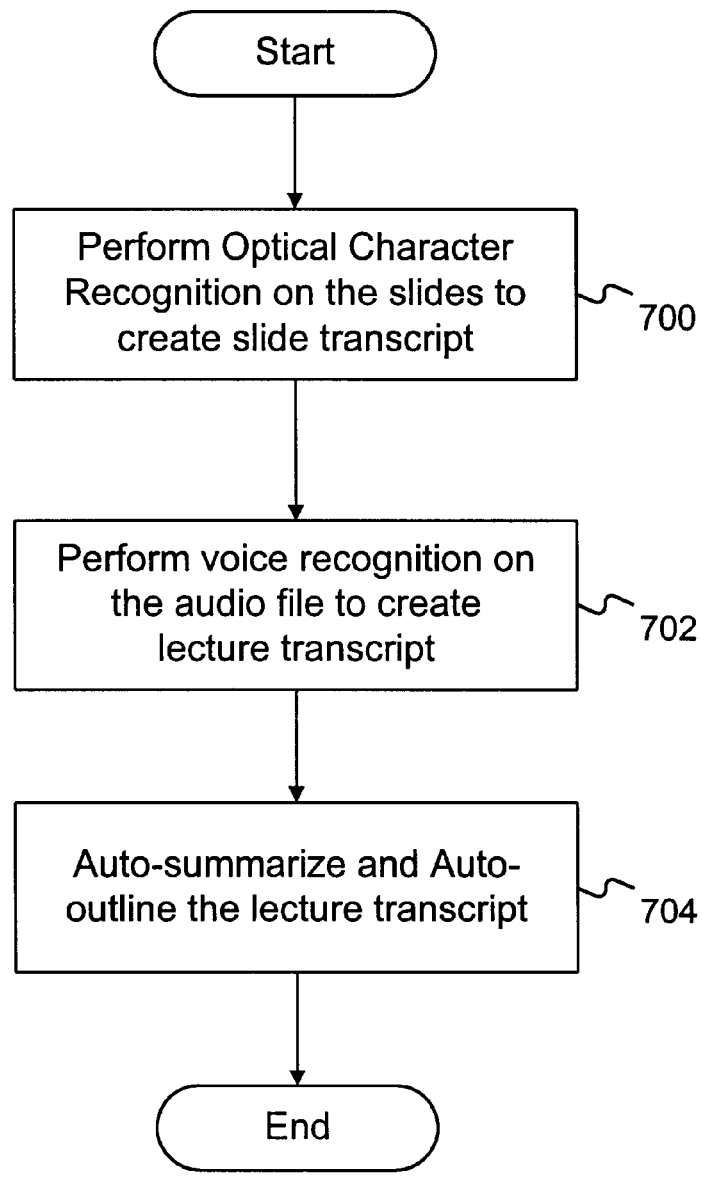
FIG. 7 is a flowchart illustrating a method for enhancing a captured lecture consistent with the present invention.

FIG. 7 depicts a flowchart illustrating a method for enhancing a captured lectured consistent with the present invention. When the lecture is complete, and the system has all of the source files described above, in one implementation, it may enter "lecture enhancement mode." In this mode, the system creates transcripts of the contents of the slides and the lecture, and automatically categorizes and outlines these transcripts. Additionally, the slide image data files may be edited as well, for example, to remove unnecessary slides or enhance picture quality.

Initially, optical character recognition (OCR) is performed on the content of the slides (step 700). OCR converts the text on the digital images captured by the CCD 206 (digital camera) into fully searchable and editable text documents. The performance of the optical character recognition may be implemented by OCR software on the computer 102. In one implementation, these text documents are stored as a standard ASCII file. Through the use of the time-stamp file, this file is chronologically associated with slide image data.

Similarly, voice recognition is performed on the audio file to create a transcript of the lecture speech, and the transcript is stored as an ASCII file along with time-stamp information (step 702). The system also allows a system administrator the capability to edit the digital audio files so as to remove gaps or improve the quality of the audio using products such as WaveConvertPro (Waves, Ltd., Knoxville, Tenn.).

Content categorization and outlining of the lecture transcripts is performed by the computer 102 using a software package such as LinguistX™ from Inxight of Palo Alto, Calif. (step 704). The resulting information is stored as an ASCII file along with time-stamp information.

Web Publishing

Figure 8:
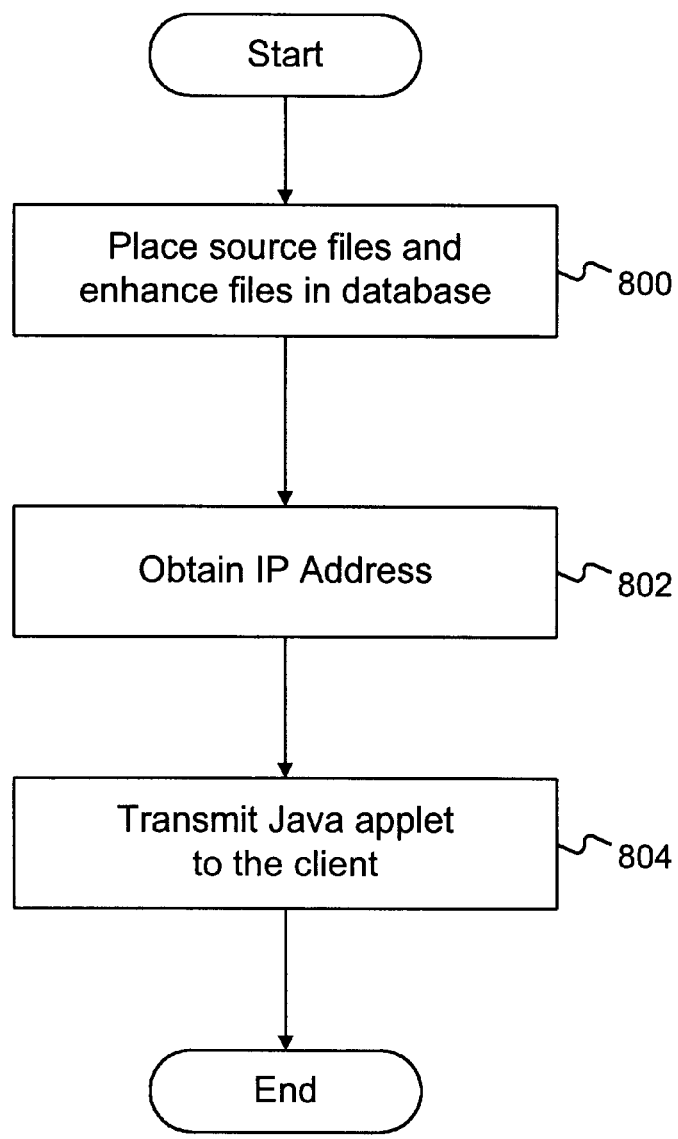
FIG. 8 is a flowchart illustrating a method for publishing a captured lecture on the Internet consistent with the present invention.

FIG. 8 is a flowchart illustrating a method for publishing a captured lecture on the Internet consistent with the present invention. After lecture capture or enhancement, (step 800), the system may be set to "Web-publishing mode." It should be noted that the enhancement of the lecture files is not a necessary process before the Web-publishing mode but simply an optimization. Also, note that for the Web-publishing mode to operate, a live Ethernet port that is Internet accessible must be connected. Standard Internet protocols (i.e., TCP/IP) are used for networking. In this mode, all of the source files generated in the lecture capture mode, as well as the content produced in the enhancement mode, are placed in a database 318 (step 800). Two types of databases may be utilized: relational and object oriented. Each of these types of databases is described in a separate section below.

Consistent with the present invention, the system obtains a temporary "IP" (Internet Protocol) address from the local server on the network node to which the system is connected (step 802). The IP address may be displayed on the LCD panel display 106.

When a user accesses this IP address from a remote Web-browser, the system (the "server") transmits a Java applet to the Web-browser (the "client") via the HTTP protocol, the standard Internet method used for transmitting Web pages and Java applets (step 804). The transmitted Java applet provides a platform-independent front-end interface on the client side. The front-end interface is described below in detail. Generally, this interface allows the client to view all of the lecture content, including the slides, audio, transcripts and outlines. This information is fully searchable and indexed by topic (such as a traditional table of contents), by word (such as a traditional index in the back of a book), and by time-stamp information (denoting when slide changes occurred).

The lecture data source files stored on the secondary storage device 310 can be immediately served to the Internet as described above. In addition, in one implementation, the source files may optionally be transferred to external web servers. These source files can be transferred via the FTP (File Transfer Protocol), again using standard TCP/IP networking, to any other computer connected to the Internet. They can then be served as traditional HTTP web pages or served using the Java applet structure discussed above, thus allowing flexibility of use of the multimedia content.

Use of the Captured Lecture and the Front-End Interface

The end-user of a system consistent with the present invention can navigate rapidly through the lecture information using a Java applet front-end interface. This platform-independent interface can be accessed from traditional PC's with a Java-enabled Web-browser (such as Netscape Navigator™ and Microsoft Internet Explorer™) as well as Java-enabled Network Computers (NCs).

Figure 9:
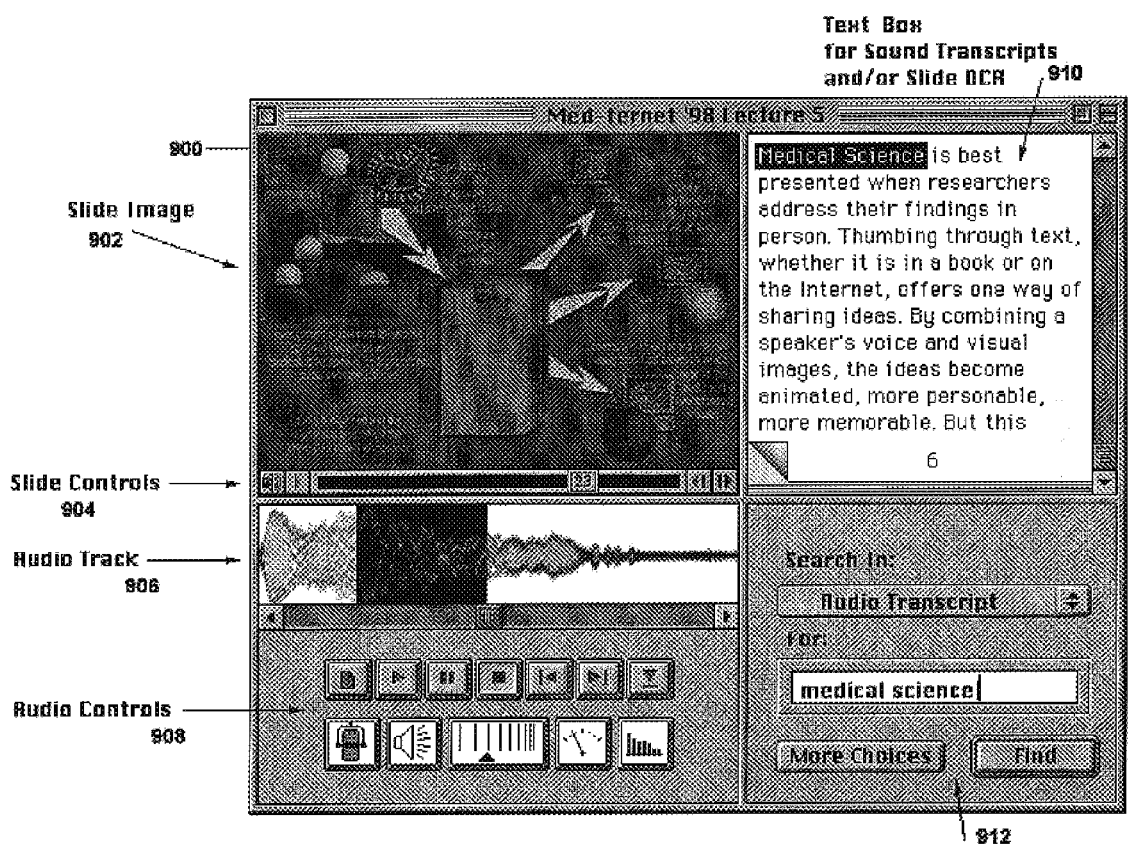
FIG. 9 shows an example of a front-end interface used to access the database information consistent with the present invention.

FIG. 9 shows a front-end interface 900 consistent with the present invention. The front-end interface provides a robust and platform-independent method of viewing the lecture content and performing searches of the lecture information. In one implementation, the interface consists of a main window divided into four frames. One frame shows the current slide 902 and contains controls for the slides 904, another frame shows the audio controls 908 with time information 906, and a third frame shows the transcript of the lecture 910 and scrolls to follow the audio. The fourth frame contains a box in which the user can enter search terms 912, a pop-up menu with which the user can select types of media they wish to search, and a button that initiates the search. Examples of search methodologies include: chronological, voice transcript, slide transcript, slide number, and keyword. The results of the search are provided in the first three frames showing the slides, the audio and the transcripts. In another implementation consistent with the present invention, another window is produced which shows other relevant information, such as related abstracts.

Description of the Database Structure

Before the source files generated in the lecture capturing process can be published in a manner that facilitates intelligent searching, indexes to the source files must be stored in a database. The purpose of the database is to maintain links between all source files and searchable information such as keywords, author names, keywords in transcripts, and other information related to the lectures.

There are two major methods for organizing a database that contains multiple types of media (text, graphics and audio): object-oriented and relational. An object-oriented database links together the different media elements, and each object contains methods that allow that particular object to interact with a front-end interface. The advantage of this approach is that any type of media can be placed into the database, as long as methods of how this media is to be indexed, sorted and searched are incorporated into the object description of the media.

The second method involving a relational database provides links directly to the media files, instead of placing them into objects. These links determine which media elements are related to each other (i.e., they are responsible for synchronizing the related audio and slide data).

Figure 10:
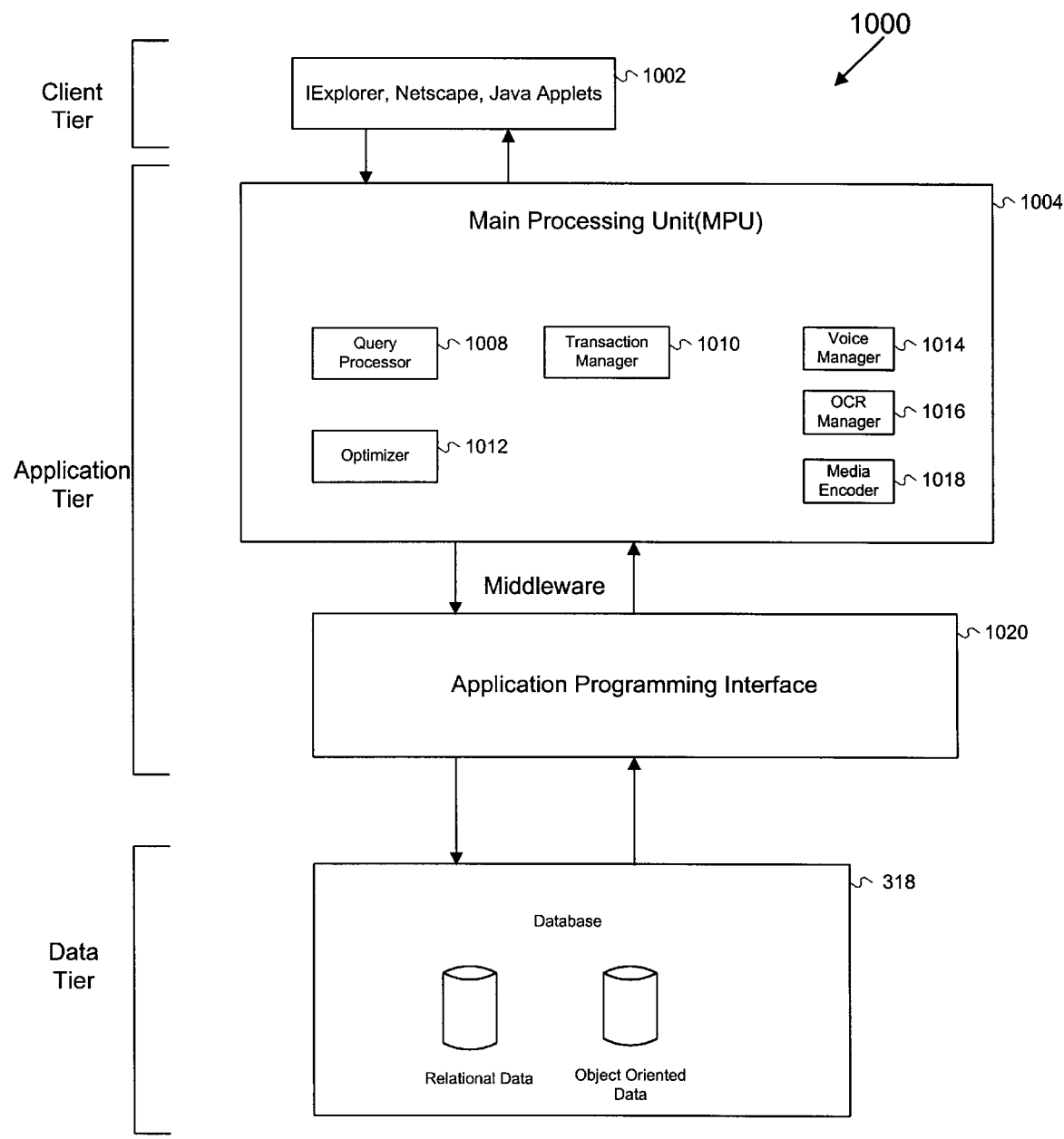
FIG. 10 shows a schematic of a three-tier architecture consistent with the present invention.

FIG. 10 shows a schematic of a three-tier architecture 1000 used to store and serve the multimedia content to the end-user. As shown in FIG. 10, the database 318 comprises part of the three-tier architecture 1000. The database 318 (labeled as the "data tier") is controlled by an intermediate layer instead of directly by the end-user's interface 1002 (labeled as the "client tier"). The client is a computer running a Web-browser connected to the Internet. The intermediate layer, labeled as the "application tier," provides several advantages. One advantage is scalability, whereas more servers can be added without bringing down the application tier. Additionally, the advantage of queuing allows requests from the client to be queued at the application tier so that they do not overload the database 318. Finally, there is increased compatibility. Although the application tier and front-end are Java based, the database 318 can communicate with the application tier in any manner which maximizes performance. The method of communication, protocols used, and types of databases utilized do not affect the communication between the business logic and the front-end.

FIG. 10 also shows how the application tier consists of a Main Processing Unit (MPU) 1004 and middleware 1020. On the MPU resides the custom Java code that controls query processing 1008, manages transactions 1010 and optimizes data 1012. Additionally, this code performs OCR 1014 and voice recognition 1016 and encodes the media 1018. The middleware 1020 provides a link between the custom Java code and the database 318. This middleware 1020 already exists as various media application programming interfaces (APIs) developed by Sun Microsystems, Microsoft, and others. The middleware 1020 abstracts the custom Java code from the database 318.

The end-user or client interacts with the MPU 1004 within the application tier. In addition, information entering the database 318 from the "lecture-capture mode" of the system enters at the application tier level as well. This information is then processed within the MPU 1004, passed through the middleware 1020, and populates the database 318.

Alternative Embodiments

There are many different methods of implementing a system that performs functions consistent with the present invention. Several alternative embodiments are described below.

Separation into Different Units

In one embodiment consistent with the present invention, the system is separated into several physical units, one for each mode (i.e., lecture capture, enhancement and publishing). One physical unit is the projection device and computer that contains all of the necessary hardware to perform the lecture-capturing process. This hardware includes the mirror assembly, the CCD digital camera, a computer with video and audio capturing ability, an infrared sensing unit, and networking ability. In this implementation, the sole function of this unit is to capture the lecture and create the source files on the secondary storage of the unit. This capture device contains the projection optics and can display either 35-mm slides, a computer-generated presentation, overhead transparencies or paper documents.

In this implementation, the lecture enhancement activities are performed in a separate physical enclosure. This separate device contains a computer with networking ability that performs the OCR, voice recognition and auto-summarization of the source files generated in the lecture capturing process.

Finally, a third physical enclosure provides Web-publishing function and contains a computer with network ability, a database structure and Internet serving software.

In this modular design, several categories of products can be envisioned. One provides lecture capturing ability only and requires only the lecture-capturing devices. This system is responsible for the creation and serving of the generated source files. Another implementation provides lecture capturing and Web serving and only requires the lecture-capturing devices and the Web-publishing devices. Yet another implementation adds the lecture-enhancement device to the above set-up and also makes the lecture transcripts and summaries available to the Web.

Separation of the Mirror Assembly from the Projection Device and Computer

Figure 11:
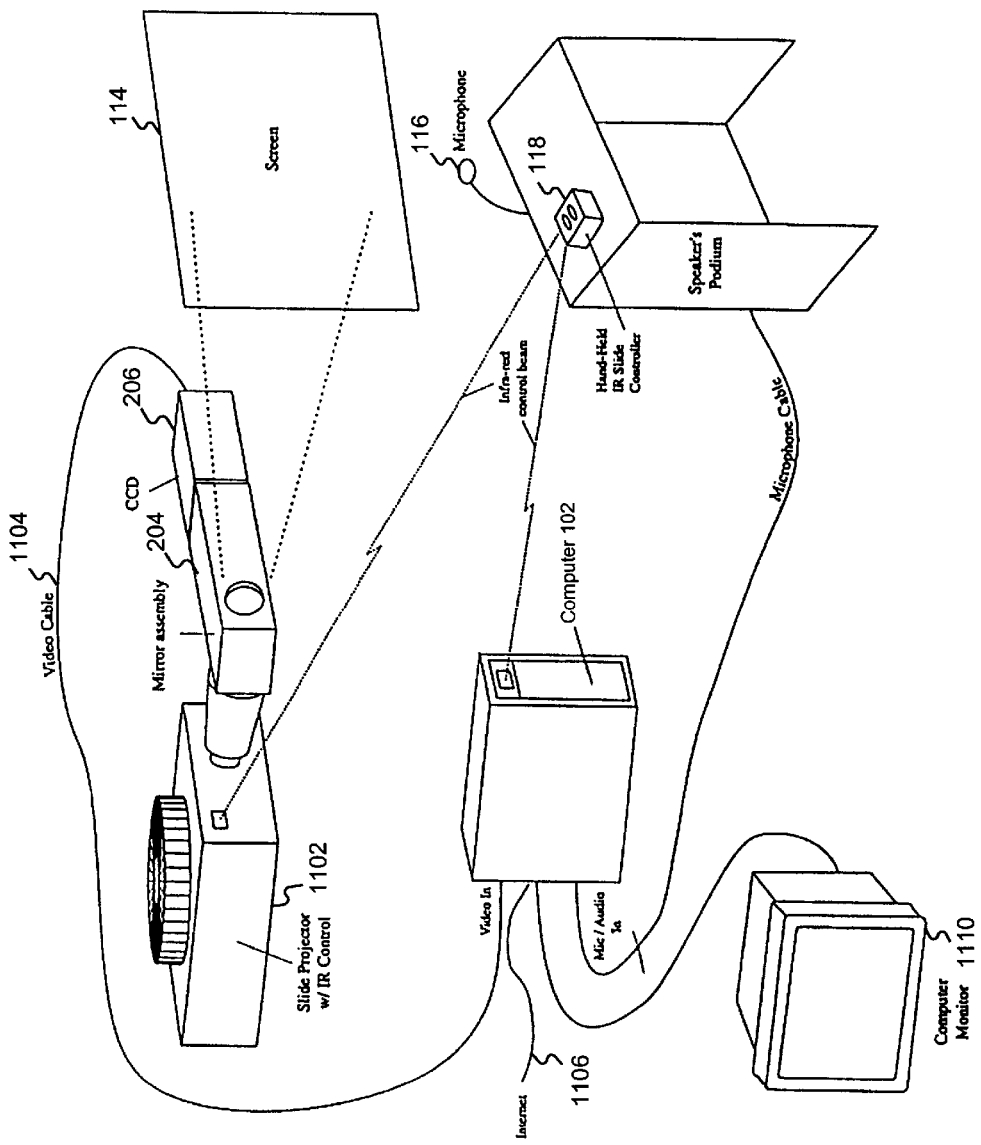
FIG. 11 shows an alternative implementation consistent with the present invention in which the projection device is separate from the lecture capture hardware.

FIG. 11 depicts a lower-cost and even more modular way of providing the lecture-capturing functionality involving the separation of the mirror assembly 204 and CCD 206 from the projection device. In this embodiment, the mirror assembly 204 and CCD 206 are a separate unit that snaps onto the lens of the 35-mm slide projector 1102. As shown in FIG. 11, the mirror assembly 204 and CCD 206 is connected by video cable 1104 to the computer 102, which sits in a separate box. This connection allows the computer 102 to receive digital video image data from the CCD 206 and to control the action of the mirror 204 via the solenoid 202 (shown in FIG. 2). The infrared beam from the slide controller 118 signals a slide change to both the slide projector 1102 and the computer 102. Both the infrared sensors on both devices are configured to receive the same IR signal so that the slide controller 118 can control both devices. For instance, the slide projector 1102 may be purchased with a slide controller 118, in which case the slide projector 1102 will already be tuned to the same infrared frequency as the slide controller 118, and the infrared sensor in the computer 102 may be built or configured to receive the same infrared frequency emitted by the slide controller 118. Such configuration of an infrared sensor to a particular frequency is well known to those skilled in the art. Additionally, a computer monitor 1110 is used in place of the LCD display. The advantage of this modular setup is that once the appropriate software is installed, the user is able to use any computer and projection device desired, instead of automatically having them provided in the lecture-capturing box described above.

For capturing computer-generated presentations, the mirror assembly is not used and the video signal and mouse actions from the user's slide-generating computer pass through the capture computer before going to the LCD projector. This enables the capture computer to record the slides and change times.

Figure 12:
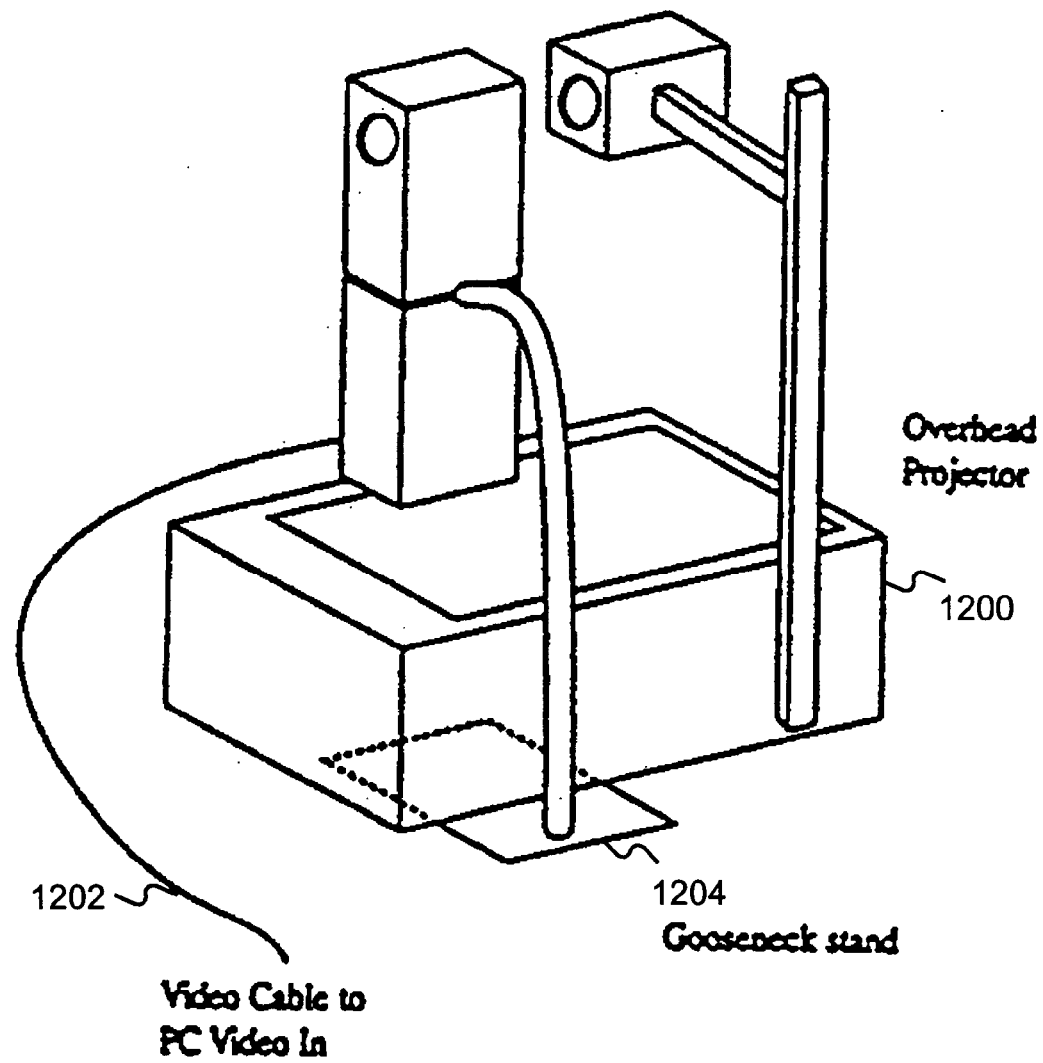
FIG. 12 shows alternate connections to an overhead projector with a mirror assembly consistent with the present invention.

FIG. 12 shows another implementation using the connection of a separate CCD 206 and mirror assembly 204, described above, to a standard overhead projector 1200 for the capture of overhead transparencies. A video cable 1202 passes the information from the CCD 206 to the computer 27. A gooseneck stand 1204 holds the CCD 206 and mirror assembly 204 in front of the overhead projector 1200.

Alternate Slide Capture Trigger

With the use of a Kodak Ektapro Slide Projector (Kodak, Rochester, N.Y.) which can either be incorporated into device 100 or used as a stand-alone slide projector 1102, an alternative method of communicating the status of the slide projector to the computer 102 uses the P-Com protocol (Kodak, Rochester, N.Y.). The P-Com protocol is communicated between the slide projector and the computer 102 over an RS-232 interface that is built into the Ektapro projector. The information obtained from the projector provides the computer 102 with the data signaling that a slide change has occurred and hence, the computer will then digitally capture the slide. This alternative approach alleviates the need for detecting signals from the infrared controller 118 and IR sensor 104 or the wired slide controller.

Alternate Front-End Interfaces

Although the front-end interface described above is Java-based, if the various modes of operation are separated, alternate front-end interfaces can be employed. For example, if lecture capture is handled by a separate device, its output is the source files. In this case, these source files can be transferred to a separate computer and served to the Internet as a web site comprised of standard HTML files.

In another implementation, the front-end interface can also be a consumer-level box which contains a speaker, a small LCD screen, several buttons used to start and stop the lecture information, a processor used to stream the information, and a network or telephone connection. This box can approach the size and utility of a telephone answering machine but provides lecture content instead of just an audio message. In this implementation, the lecture content is streamed to such a device through either a standard telephone line (via a built-in modem for example) or through a network (such as a cable modem or ISDN). Nortel (Santa Clara, Calif.) provides a "Java phone" which can be used for this purpose.

Alternate Implementation of Application Tier

The system described in the Main Processing Unit (1004) and the Application Programming Interface (1020) can be programmed using a language other than Java, e.g., C, C++ and/or Visual Basic Languages.

Alternate Optical Assembly for Image Capture

Another implementation of the present invention replaces the mirror assembly 204 with a beam splitter (not shown). This beam splitter allows for slide capture at any time without interruption, but reduces the intensity of the light that reaches both the digital camera and the projection screen 114.

If a beam splitter is used, redundancies can be implemented in the slide-capturing stage by capturing the displayed slide or transparency, for example, every 10 seconds regardless of the slide change information. This helps overcome any errors in an automated slide change detection algorithm and allows for transparencies that have been moved or otherwise adjusted to be recaptured. At the end of the lecture, the presenter can select from several captures of the same slide or transparencies and decide which one should be kept.

System Diagnosis

In one implementation consistent with the present invention, the user can connect a keyboard and a mouse, along with an external monitor to the SVGA-out port 504. This connection allows the user access to the internal computer 102 for software upgrades, maintenance, and other low-level computer functions. Note that the output of the computer 102 can be directed to either the LCD projection device or the LCD panel 106.

Wireless Communications

In one implementation consistent with the present invention, the network connection between the computer and the Internet can be made using wireless technology. For example, a 900 MHZ connection (similar to that used by high quality cordless phones) can connect the computer 102 to a standard Ethernet wall outlet. Another option uses wireless cellular modems (like those produced by Ricochet) for the Internet connection.

Electronic pointer

In another implementation, an electronic pointer is added to the system. Laser pointers are traditionally used by presenters to highlight portions of their presentation as they speak. The movement of these pointers can be tracked and this information recorded and time-stamped. This allows the end-user to search a presentation based on the movement of the pointer and have the audio and video portion of the lecture synchronized with the pointer.

Spatial positional pointers can also be used in the lecture capture process. These trackers allow the system to record the presenter's pointer movements in either 2-dimensional or 3-dimensional space. Devices such as the Ascension Technology Corporation pcBIRD™ or 6DOF Mouse™ (Burlington, Vt.), INSIDETRAK HP by Polhemus Incorporated (Colchester, Vt.), or the Intersense IS-300 Tracker from Intersense (Cambridge, Mass.) can be used to provide the necessary tracking capability for the system. These devices send coordinate (x, y, z) data through an RS-232 or PCI interface which communicates with the CPU 306, and this data is time-stamped by the timer 308.

Conclusion

Methods and systems consistent with the present invention provide a streamlined and automated process for digitally capturing lectures, converting these lectures into Web-ready formats, providing searchable transcripts of the lecture material, and publishing this information on the Internet. The system integrates many different functions into an organized package with the advantages of lowering overall costs of Internet publishing, speeding the publishing process considerably, and providing a fully searchable transcript of the entire lecture. Since the lecture is ready for publishing on the Web, it is viewable on any computer in the world that is connected to the Internet and can use a Web browser. Additionally, anyone with an Internet connection may search the lecture by keyword or content.

The foregoing description of an implementation of the invention has been presented for purposes of illustration and description. It is not exhaustive and does not limit the invention to the precise form disclosed. Modifications and variations are possible in light of the above teachings or may be acquired from practicing of the invention. The scope of the invention is defined by the claims and their equivalents.

What is claimed is:

1. A method of capturing a live presentation, comprising the steps of:

capturing still images from a display device which displays said still images for viewing by an audience during a live presentation;

during the live presentation, detecting the change over form one still image to another;

recording the audio portion of a speaker's presentation during a live presentation; and in response to said detected change over from one still image to another, automatically synchronizing change over from one still image to another with the audio recording.

2. A method of capturing a live presentation, comprising the steps of:

capturing still images from a display device which displays said still images for viewing by an audience during a live presentation, wherein the step of capturing still images from the display device includes the steps of diverting light image from the display device to a digital imaging device;

during the live presentation, detecting the change over form one still image to another;

recording the audio portion of a speaker's presentation during a live presentation; and in response to said detected change over from one still image to another, automatically synchronizing change over from one still image to another with the audio recording.

3. A method of capturing a live presentation, comprising the steps of:

capturing still images from a display device which displays said still images for viewing by an audience during a live presentation, wherein the step of capturing still images includes diverting a portion of the light still image from the display device onto a digital imaging device;

during the live presentation, detecting the change over form one still image to another;

recording the audio portion of a speaker's presentation during a live presentation; and in response to said detected change over from one still image to another, automatically synchronizing change over from one still image to another with the audio recording.

4. A method of capturing a live presentation, comprising the steps of:

capturing still images from a display device which displays said still images for viewing by an audience during a live presentation, wherein the step of capturing still images includes integrating an image diverting and capture device in front of a still image projection device;

during the live presentation, detecting the change over form one still image to another;

recording the audio portion of a speaker's presentation during a live presentation; and in response to said detected change over from one still image to another, automatically synchronizing change over from one still image to another with the audio recording.

5. A method in according with claim 1, further comprising the step of displaying a still image on the display device which displays said still images for viewing by an audience.

6. A method in accordance with claim 5, wherein the displaying step includes the steps of presenting a slide on an image projection device, said slide originating from one of a computer program, a negative film, an overhead transparency and an opaque paper projection device.

7. A method in accordance with claim 1, wherein the step of recording includes the step of picking up an audio signal from a microphone adjacent to the person giving the live presentation.

8. A method in accordance with claim 1, wherein the step of automatically synchronizing change over one still image to another still image with the audio recording includes manual input of the change over event.

9. A method in accordance with claim 1, wherein the step of automatically synchronizing change over one still image to another still image with the audio recording includes automatically detecting the change over event.

10. A method in accordance with claim 1, further comprising the steps of determining the location of an input device pointer on the display device; and associating a time stamp with a determined location, wherein the automatic synchronizing step further includes the step of storing the determined location of the pointer and the associated time stamp into memory.

11. A method in accordance with claim 1, further comprising the steps of storing the captured still images in a database; and providing search capabilities for searching the database.

12. A method in accordance with claim 10, further comprising the step of creating a searchable transcript of text in the still images.

13. A method in accordance with claim 11, wherein the step of creating a transcript includes optical character recognition.

14. A method in accordance with claim 11, further comprising the step of auto-summarizing the transcript to generate an a summary of the transcript.

15. A method in accordance with claim 11, further comprising a step of auto-outlining the transcript to generate an outline of the transcript.

16. A method in accordance with claim 1, further including the step of transmitting said captured still images and recorded audio portion of a presentation to a network in a format suitable for viewing over the network.

17. A method in accordance with claim 16, further including the step of sending the captured still images and audio recording to a client via the Internet.

18. A method in accordance with claim 17, further including the step of converting the audio recording of the live presentation into a streaming format for transfer via the Internet.

* * * * *